(12) United States Patent
Inui

(10) Patent No.: US 6,765,735 B2
(45) Date of Patent: Jul. 20, 2004

(54) METHOD AND APPARATUS FOR MAGNETIC TRANSFER

(75) Inventor: Tsuneo Inui, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 250 days.

(21) Appl. No.: 09/950,062

(22) Filed: Sep. 12, 2001

(65) Prior Publication Data

US 2002/0030910 A1 Mar. 14, 2002

(30) Foreign Application Priority Data

Sep. 12, 2000 (JP) ........................................ 2000-275839

(51) Int. Cl.$^7$ ................................................ G11B 5/86
(52) U.S. Cl. ............................................ 360/17; 360/55
(58) Field of Search ........................... 360/16, 17, 59, 360/55, 15; G11B 5/86

(56) References Cited

U.S. PATENT DOCUMENTS

| | | | | |
|---|---|---|---|---|
| 3,878,061 A | * | 4/1975 | Feldstein ..................... | 205/75 |
| 4,032,923 A | * | 6/1977 | Pond et al. .................. | 360/59 |
| 4,179,211 A | * | 12/1979 | Kimura et al. ................ | 399/21 |
| 4,626,931 A | * | 12/1986 | Hori et al. ................... | 360/16 |
| 4,727,440 A | * | 2/1988 | Farrow et al. ................ | 360/71 |
| 5,121,258 A | * | 6/1992 | Chi et al. .................... | 360/17 |

FOREIGN PATENT DOCUMENTS

| | | | | |
|---|---|---|---|---|
| EP | 0 915 456 A1 | 5/1999 | ............ | G11B/5/86 |
| JP | 63-183623 | 7/1988 | ............ | G11B/5/86 |
| JP | 11-235275 | 8/1999 | ............ | A47J/27/00 |
| JP | 2000-97521 | 4/2000 | ........... | F25B/41/06 |
| JP | 2002-85637 | 10/2000 | | |
| JP | 2001167434 A | * 6/2001 | ............ | G11B/5/86 |
| JP | 2001-1351234 | 12/2001 | | |
| WO | WO 00/65579 | 11/2000 | | |

OTHER PUBLICATIONS

Communication from Intellectual Property Office of Singapore for Singapore Patent Application No. 200105526–8, of Jan. 19, 2004.

Australian Patent Office Search Report for Appl'n No. SG 200105526–8, of Dec. 1, 2003.

Australian Patent Office Examination Report for Appl'n No. SG 200105526–8, of Dec. 1, 2003.

* cited by examiner

Primary Examiner—David Hudspeth
Assistant Examiner—Rocio Colon
(74) Attorney, Agent, or Firm—Sughrue Mion, PLLC

(57) ABSTRACT

In magnetic transfer performed to transfer an information signal such as a servo signal from a master medium to a slave medium, the degradation of transfer quality caused by a failure of close contact between the master medium and the slave medium due to dust accumulated thereon is prevented. Magnetic transfer means is provided to carry out the magnetic transfer by bringing the master medium bearing information and the slave medium into close contact with each other, and applying a transfer magnetic field. Replacing means is provided to prepare a plurality of master media, and replacing the master medium after magnetic transfer is performed a predetermined number of times. Cleaning means is also provided to clean the replaced master medium by ultrasonic washing or the like.

2 Claims, 1 Drawing Sheet

METHOD AND APPARATUS FOR MAGNETIC TRANSFER

BACKGROUND OF THE INVENTION

1. Field of the Invention

The present invention relates to a method and an apparatus for magnetically transferring information from a master medium bearing the information to a slave medium.

2. Description of the Prior Art

A magnetic transfer method is one in which magnetic patterns corresponding to information (e.g., servo signals) recorded in a master medium are transferred by applying a transfer magnetic field in a state where the master medium and a slave medium are in close contact with each other. Such a magnetic transfer method is disclosed, for example, in Japanese Unexamined Patent Publication Nos. 63(1988)-183623, 10(1998)-40544, 10(1998)-269566, and so on.

Incidentally, during the magnetic transfer by the foregoing magnetic-transfer method, the repeated use of the master medium causes dust to be stuck to the surface of the master medium, resulting in contamination thereof. As dust to be stuck to the master medium, that which is generated in a surrounding environment, chips of the master and slave media generated by contact therebetween may be mentioned.

If the magnetic transfer is carried out in a state where the dust is stuck to the master medium, close contact cannot be secured between the master medium and the slave medium in an area ranging from the dust stuck portion as a center to a periphery, and pattern transfer of a predetermined signal level cannot be executed. Consequently, the magnetic transfer quality is reduced. If a recorded signal is a servo signal, then a satisfactory tracking function cannot be obtained. Thus, there has been a problem of reduced reliability in the conventional case.

The adhesive power of the dust stuck to the surface of the master medium is increased due to the repeated close contact between the master medium and the slave medium. Therefore, in all the slave media magnetically transferred thereafter, similar or greater pattern transfer failures occur, causing the production of a large number of defective articles. In addition, such stuck objects result in the deformation of the surface of the master medium, thus causing a loss of normal function thereof.

SUMMARY OF THE INVENTION

The present invention was made in view of the foregoing problems, and an object of the present invention is to provide a method and an apparatus for magnetic transfer, capable of performing highly reliable magnetic transfer by preventing the degradation of transfer quality caused by dust in close contact between the master medium and the slave medium.

In order to achieve the foregoing object, in accordance with the present invention, a magnetic transfer method is provided for performing magnetic transfer by bringing a master medium bearing an information signal and a slave medium into close contact with each other, and then applying a transfer magnetic field. In this case, the magnetic transfer method comprises the steps of: preparing a plurality of master media; replacing the master medium after magnetic transfer is executed a predetermined number of times; and cleaning the replaced master medium.

In accordance with the present invention, a magnetic transfer apparatus is provided for performing magnetic transfer by bringing a master medium bearing an information signal and a slave medium into close contact with each other, then applying a transfer magnetic field. In this case, the magnetic transfer apparatus comprises: magnetic transfer means for performing magnetic transfer in a state of close contact between the master medium and the slave medium; replacing means for preparing a plurality of master media, and replacing a master medium after magnetic transfer is executed a predetermined number of times; and cleaning means for cleaning the replaced master medium.

The cleaning of the master medium should preferably be performed by replacing a master medium for each magnetic transfer process. Specifically, preferred cleaning is one performed based on a wet process by washing liquid, which uses alcohol, pure water or organic solvent. Especially, ultrasonic washing is preferable. In addition, cleaning by air blowing, especially electrostatic air blowing, may be employed, and wiping cleaning by using a wiping material may also be employed.

To prevent the peeling-off of a magnetic film or the like from the master medium caused by the cleaning, the adhesive power of this thin metal film to a substrate or the like should preferably be set equal to $1 \times 10^9$ N/m$^2$ or higher.

A preferred magnetic transfer method is one designed to perform magnetic transfer in the following manner. Specifically, the slave medium is subjected to DC magnetization in a track direction, and this slave medium and a magnetic transfer master medium, on which a magnetic layer is formed into micro uneven patterns corresponding to information to be transferred, are brought into close contact with each other, then applying a transfer magnetic field in a direction roughly reverse to the initial DC magnetizing direction of the slave medium. As to the aforementioned information to be transferred, a servo signal is preferred.

According to the present invention, a plurality of master media are prepared and the master medium is replaced and cleaned after magnetic transfer is performed a predetermined number of times, whereby the quantity of dust stuck to the master medium can be reduced. Therefore, it becomes possible to prevent the degradation of a transfer signal caused by a failure of close contact between the master medium and the slave medium due to objects stuck therebetween, and to execute magnetic transfer with stable quality. Thus, the reliability thereof can be improved.

DESCRIPTION OF THE PREFERRED EMBODIMENTS

Figure 1:
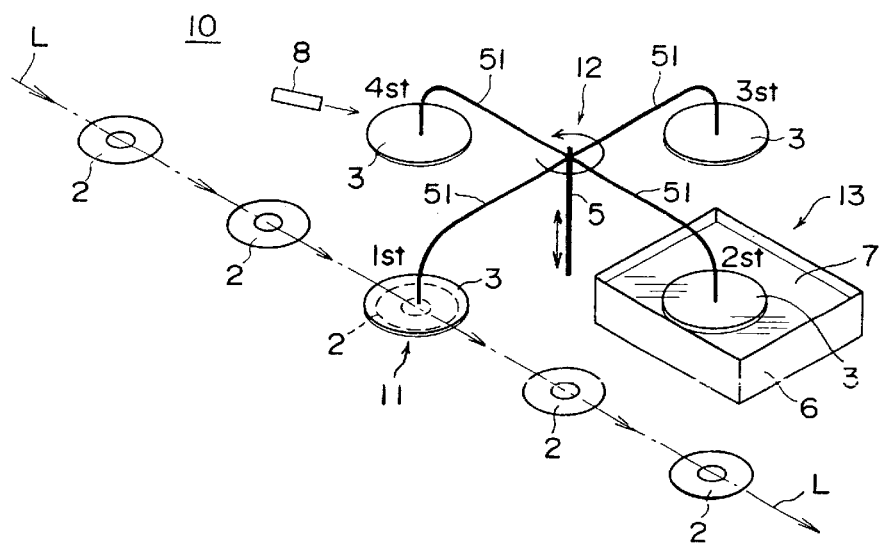
FIG. 1 is a schematic view of a magnetic transfer apparatus according to an embodiment of the present invention.

Next, the preferred embodiment of the present invention will be described in detail. FIG. 1 is a schematic view showing the mechanism of a magnetic transfer apparatus.

The magnetic transfer method basically comprises the steps of: preparing a plurality of master media 3 (four pieces in the drawing); and cleaning the master medium 3 to be supplied for a magnetic transfer operation before the magnetic transfer is carried out in which the master medium 3 and a slave medium 2 are brought into close contact with each other. The master medium 3 is replaced after magnetic transfer is performed a predetermined number of times, and dust on a close contact surface between the master medium 3 and the slave medium 2 is reduced.

In a magnetic transfer apparatus 10 shown in FIG. 1, the slave medium 2 is conveyed on a main line L, and magnetic transfer means 11 is provided in the midway of this main line L. At this magnetic transfer means 11, the information bearing plane of the master medium 3 and the recording plane of the slave medium 2 are superposed, and pressed from upper and lower sides to bring them into close contact with each other. In this close contact state, a transfer magnetic field is applied by an electromagnet device (not shown) and a magnetic pattern corresponding to the transfer information of the master medium 3 is transferred and recorded in the slave medium 2. The details of magnetic transfer by the magnetic transfer means 11 will be described later by referring to FIGS. 2A to 2C.

After the transfer, the slave medium 2 is conveyed to a discharge side on the main line L. A used master medium 3, which has performed the magnetic transfer a predetermined number of times, is carried to cleaning means 13 by replacing means 12. A new master medium 3 which has already been cleaned is fed to the magnetic transfer means 11, and the magnetic transfer is carried out for a next slave medium 2. Replacement of the master medium 3 for a cleaned one may be performed for each magnetic transfer. However, since time required for one magnetic transfer is relatively short, according to time required for later-described washing or the like, the master medium 3 may be replaced for every plurality of magnetic transfer operations executed by one master medium 3 within the permissible range of transfer quality affected by dust.

The replacing means 12 is constructed in such a manner that for example four master media 3 are disposed on a circumference at equal pitches (for each 90°), these master media 3 are interconnected by four arms 51 fixed to a rotary shaft 5, and sequentially rotated and moved from first to fourth stations 1st to 4st. The first station 1st constitutes the magnetic transfer means 11, and the second to fourth stations 2st to 4st constitute the cleaning means 13.

The cleaning means 13 has a washing liquid tank 6 in the second station 2st, in which washing liquid 7 such as alcohol, pure water, or organic solvent is poured. The washing liquid tank 6 is provided with an ultrasonic oscillator (not shown) for oscillating the washing liquid 7. When the master medium 3 is put into the washing liquid tank 6, dust, stains or the like stuck thereto are washed and removed by the ultrasonic vibration of the washing liquid 7. The third station 3st is provided with another liquid tank (not shown) and rinsing is carried out therein. Then, at the fourth station 4st, drying is carried out by blowing dry wind or the like from a nozzle 8. As described above, the master media 3 having been subjected to the cleaning by the cleaning means 13 are sequentially moved by the replacing means 12 to the magnetic transfer means 11 of the first station 1st, and brought into close contact with the slave media 2, thus carrying out the magnetic transfer.

Note that the number of movable stations by the replacing means 12 is not limited to four places. The number thereof and tact time are selected according to necessary cleaning time or the like corresponding to a cleaning method or the like. Also, the rotary shaft 5 and the arms 51 are set to move the master medium 3 upward and downward in addition to the rotational movements thereof. The shaft and the arm rotate in the raised state, avoiding each of the stations 1st to 4st, and processes are executed at each station in the lowered state.

For the cleaning means 13, other than the wet process of ultrasonic washing using washing liquid, electrostatic ultrasonic air blow, in which air obtained by subjecting discharged air to ultrasonic oscillation is blown to the master medium 3, and suction of such air may be carried out. Or, the surface of the master medium 3 may be wiped and cleaned by a wiping material such as wiping cloth, and other widely known cleaning methods can be used. In such a case, a cleaning method and a cleaning material must be selected so as to prevent any damage to the surface of the master medium 3.

Figure 2A:
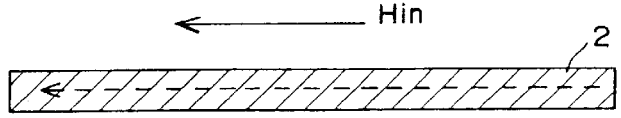
FIGS. 2A to 2C are views showing magnetic transfer according to the embodiment.
Figure 2B:
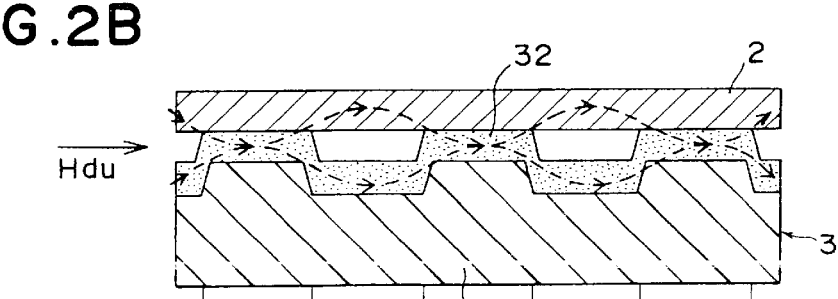
Figure 2C:
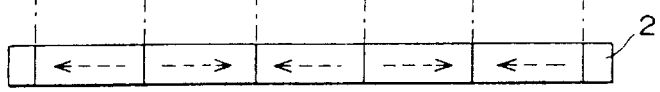

FIGS. 2A to 2C are views showing the basic mode of magnetic transfer. Specifically, FIG. 2A shows the step of subjecting the slave medium 2 to initial DC magnetization by applying a magnetic field in one direction; FIG. 2B shows the step of applying a magnetic field in an opposite direction in the state of close contact between the master medium 3 and the slave medium 2; and FIG. 2C shows a state after the magnetic transfer. Note that the relation of top and bottom between the slave medium 2 and the master medium 3 in FIG. 2B is reverse that shown in FIG. 1.

First, as shown in FIG. 2A, initial magnetization (DC demagnetization) is performed beforehand by applying an initial magnetic field Hin to the slave medium 2 in one track direction thereof. Then, as shown in FIG. 2B, the magnetic transfer plane of the slave medium 2 is brought into close contact with an information bearing plane formed by coating a magnetic layer 32 (thin metal film) on the micro uneven patterns of the substrate 31 of the master medium 3, and magnetic transfer is carried out by applying a transfer magnetic field Hdu in a track direction of the slave medium opposite to that of the initial magnetic field Hin. As a result, as shown in FIG. 2C, information corresponding to a pattern formed between the close contact convexities and concavities of the magnetic layer 32 of the information bearing plane of the master medium 3 is magnetically transferred and recorded in the magnetic transfer plane (track) of the slave medium 2. The foregoing initial magnetization is carried out on the slave medium 2 by the magnetic transfer means 11, or on the main line L before that. Alternatively, the initial magnetization is carried out to the slave medium 2 before being fed to the main line L.

Note that even if the uneven patterns of the substrate 31 of the master medium 3 are uneven negative patterns opposite to the positive patterns of FIGS. 2A to 2C, similar information can be magnetically transferred and recorded by setting the direction of the initial magnetic field Hin and the direction of the transfer magnetic field Hdu reverse to the foregoing.

If the substrate 31 is a ferromagnet such as Ni, the magnetic transfer can be performed by the substrate 31 only, and it is not necessary to cover the substrate 31 with the foregoing magnetic layer 32 (soft magnetic layer). However, good magnetic transfer can be achieved by providing a magnetic layer 32 having excellent transfer properties. When the substrate 31 is made of a nonmagnetic substance, it is necessary to provide the magnetic layer 32.

When the substrate 31 made of ferromagnetic metal is covered with the magnetic layer 32, a nonmagnetic layer should preferably be provided between the substrate 31 and the magnetic layer 32 in order to shield the influence of the magnetism of the substrate 31. Furthermore, when a protective film such as diamond-like carbon (DLC) is provided on the uppermost layer, this protective film enhances resistance to contact, and the magnetic transfer can be performed a large number of times. Also, an Si film may be formed under the DLC protective film by sputtering or the like.

With respect to the foregoing master medium 3, in the cleaning means 13, especially in the cleaning carried out by applying ultrasonic vibration, so as not to peel off the metal thin film layer of the magnetic layer 32 or the like from the substrate 31 due to such ultrasonic vibration or the like, adhesive power between the two should preferably be increased to $1 \times 10^9$ N/m$^2$ or higher.

Next, the master medium 3 will be described. For the substrate 31 of the master medium 3, nickel, silicon, quartz plate, glass, aluminum, an alloy, ceramics, a synthetic resin or the like is used. The formation of the uneven pattern is performed by a stamper method, a photo-fabrication method or the like.

The stamper method is performed in the following manner. Photoresist is formed on a glass plate (or quartz glass) having a flat surface by a spin coat method or the like. The glass plate is rotated, and at the same time, a laser beam (or electron beam), which is modulated in accordance with a servo signal, is radiated onto the photoresist. Predetermined patterns are formed by exposure on the full surface of the photoresist. For example, the pattern extending linearly from the center of rotation in a radial direction in each track and corresponding to a servo signal is formed by exposure in the portion corresponding to each frame on the circumference of the glass plate. Then, the photoresist is subjected to a developing process, and the exposed portions are removed. Thus, an original disk having uneven patterns by the photoresist is obtained. Subsequently, plating (electroforming) is performed for the surface of the original disk in accordance with the uneven patterns formed on the surface of the original disk, and an Ni substrate having positive uneven patterns is formed. Then, the Ni substrate is peeled off from the original disk. This substrate is used as the master medium 3 directly, or used as the master medium 3 after a nonmagnetic layer, a soft magnetic layer or a protective film is coated on the uneven patterns if necessary.

Alternatively, a substrate having negative uneven patterns may be formed in such a manner that a second original disk is formed by performing plating for the foregoing original disk, and plating is performed by using this second original disk. Further, a substrate having positive uneven patterns may be formed in such a manner that a third original disk is formed by performing plating for the second original disk or by pressing resin liquid to the second original disk to harden the same, and plating is performed for the third original disk.

On the other hand, patterns by photoresist are formed on the aforementioned glass plate, and then holes are formed in the glass plate by etching. The photoresist is removed, and thus an original plate is obtained. Subsequently, the same forming steps as the above may be performed, and thus a substrate may be obtained.

For a material of the substrate made of metal, Ni or an Ni alloy can be used. Various metal film growth methods including electroless plating, electroforming, sputtering and ion plating can be applied for forming the substrate. A depth of each uneven pattern (height of a convexity) of the substrate should preferably be set in the range of 80 nm to 800 nm, more preferably in the range of 150 nm to 600 nm. When the information signal of the master medium is a servo signal, the uneven patterns are formed so as to be longitudinal in the radial direction. For example, the uneven pattern should have a length of 0.3 to 20 $\mu$m in the radial direction of the substrate, and 0.2 to 5 $\mu$m in the circumferential direction thereof. For a pattern bearing information signals that are servo signals, it is preferable to select a pattern longer in the radial direction than in the circumferential direction within these ranges.

The formation of the magnetic layer 32 (soft magnetic layer) is performed in such a manner that a magnetic material is grown by a plating method, or by a vacuum film growth method including a vacuum evaporation method, a sputtering method, an ion plating method, and so on. For a magnetic material of the magnetic layer, one can be selected from Co, a CO alloy (CoNi, CoNiZr, CoNbTaZr, or the like), Fe, an Fe alloy (FeCo, FeCoNi, FeNiMo, FeAlSi, FeAl, and FeTaN), Ni, an Ni alloy (NiFe). FeCo and FeCoNi are particularly preferable. The thickness of the magnetic layer should preferably be set in the range of 50 nm to 500 nm, more preferably in the range of 150 nm to 400 nm. As a material of the nonmagnetic layer provided as a base layer under the magnetic layer, Cr, CrTi, CoCr, CrTa, CrMo, NiAl, Ru, C, Ti, Al, Mo, W, Ta, Nb or the like can be used. The nonmagnetic layer can suppress deterioration in quality of the signals when the substrate is made of a ferromagnetic substance.

A protective film such as DLC should preferably be formed on the magnetic layer, and a lubricant layer may be provided on the magnetic layer. It is more preferable that the DLC film and the lubricant film which have a thickness of 5 to 30 nm in total are present as the protective film on the magnetic layer. In addition, a close-contact strengthening layer such as Si may be provided between the magnetic layer and the protective film. Lubricant lessens deterioration in durability due to damage by friction when slippage of the master medium from the slave medium 2 caused in the contacting step is corrected.

A resin substrate may be formed by using the aforementioned original disk, and a magnetic layer may be provided on the surface thereof to be used as a master medium 3. For a resin material of the resin substrate, one can be selected for use from an acrylic resin such as polycarbonate and polymethyl methacrylate, a vinyl chloride resin such as polyvinyl chloride and polyvinyl chloride copolymer, an epoxy resin, amorphous polyolefin, or polyester, etc. Polycarbonate is preferable in terms of humidity resistance, dimensional stability and costs. If a molded component has burrs, the burrs are removed by burnishing or polishing. A height of the pattern convexity of the resin substrate should preferably be set in the range of 50 to 1000 nm, more preferably in the range of 200 to 500 nm.

The master medium 3 is obtained by covering the micro patterns on the surface of the resin substrate with a magnetic layer. The formation of the magnetic layer is performed in such a manner that a magnetic material is grown by a vacuum film growth method including a vacuum evaporation method, a sputtering method, an ion plating method, etc., or by a plating method.

On the other hand, the photo-fabrication method is performed in such a manner that photoresist is coated on, for example the smooth surface of a plane-shaped substrate, and patterns according to information are formed by exposure and developing processes using a photomask according to the patterns of servo signals. Then, in an etching step, the substrate is subjected to etching according to the patterns, and holes having depths equal to a thickness of the magnetic layer are formed. Subsequently, a magnetic material is grown up to the surface of the substrate with a thickness equal to the depth of the formed holes by a vacuum film growth method including a vacuum evaporation method, a sputtering method, an ion plating method, etc., or by a plating method. Then, the photoresist is removed by a lift-off method, and the surface of the substrate is polished. By this polishing, burrs are removed if they are present, while the surface is smoothed.

Next, the slave medium 2 will be described. As the slave medium 2, a coating type magnetic recording medium or a thin metal film magnetic recording medium is used. As the coating type magnetic recording medium, a medium on the market such as a high density flexible disc is mentioned. As to the thin metal film magnetic recording medium, Co, a Co alloy (CoPtCr, CoCr, CoPtCrTa, CoPtCrNbTa, CoCrB, CoNi and the like), Fe, an Fe alloy (FeCo, FePt and FeConi) can be used as a magnetic material. Since these materials have high magnetic flux densities and magnetic anisotropy in a direction identical to a direction of the magnetic field application (the direction of the magnetic field application is parallel to the surfaces of the master medium and the slave medium in the case of an intra-recording, and the direction of the magnetic field application is perpendicular to the surfaces of the master medium and the slave medium in the case of a vertical recording), these materials are preferable because a clear transfer can be performed by their use. To allow a portion (supporting body side) under the magnetic material to have necessary magnetic anisotropy, it si preferable that a nonmagnetic base layer be provided. The crystal structure and lattice constant of this nonmagnetic base layer need to be matched with those of the magnetic layer. To allow the nonmagnetic base layer to have the same crystal structure and the same lattice constant with those of the magnetic layer, Cr, CrTi, CoCr, CrTa, CrMo, NiAl, Ru or the like are used.

According to the foregoing embodiment of the present invention, in sequential magnetic transfer performed for a large number of slave media 2, the master medium 3 is replaced by another every predetermined number of magnetic transfers, and washing and cleaning are performed by the cleaning means 13 to remove dust that have accumulated thereon. Thus, it is possible to prevent deterioration in transfer quality caused by a failure of close contact between the master medium 3 and the slave medium 2 due to dust stuck to the master medium 3, and thus good magnetic transfer can be continuously performed efficiently.

What is claimed is:

1. A magnetic transfer method for performing magnetic transfer by bringing a master medium bearing an information signal and a slave medium into close contact with each other, and applying a transfer magnetic field, comprising the steps of:

preparing a plurality of master media;

replacing the master medium after the magnetic transfer is executed a predetermined number of times; and cleaning said replaced master medium.

2. A magnetic transfer apparatus for performing magnetic transfer by bringing a master medium bearing an information signal and a slave medium into close contact with each other, and applying a transfer magnetic field, comprising:

magnetic transfer means for performing the magnetic transfer in a state of close contact between the master medium and the slave medium;

replacing means for preparing a plurality of master media, and replacing the master medium after the magnetic transfer is executed a predetermined number of times; and cleaning means for cleaning said replaced master medium.

* * * * *